United States Patent
Duggar, Jr.

[15] 3,675,510
[45] July 11, 1972

[54] SPEED REDUCER

[72] Inventor: Anderson Duggar, Jr., 4350 Delemere Blvd., Royal Oak, Mich. 48073

[22] Filed: Oct. 12, 1970

[21] Appl. No.: 79,817

[52] U.S. Cl. ...................................................74/801
[51] Int. Cl. .............................................F16h 1/36
[58] Field of Search ...................................74/801

[56] References Cited

UNITED STATES PATENTS

| | | |
|---|---|---|
| 3,453,906 | 7/1969 | Junkichi ..............................74/801 |
| 2,456,814 | 12/1948 | Church ............................74/801 X |
| 476,101 | 5/1892 | Thomson ...........................74/801 |
| 3,081,648 | 3/1963 | Duer...................................74/801 |
| 3,218,889 | 11/1965 | Jarchow..............................74/801 |
| 3,421,390 | 1/1969 | Lohr....................................74/801 |

FOREIGN PATENTS OR APPLICATIONS

| | | |
|---|---|---|
| 925,687 | 5/1963 | Great Britain.........................74/801 |
| 804,223 | 11/1958 | Great Britain.........................74/801 |

*Primary Examiner*—Carlton R. Croyle
*Assistant Examiner*—Thomas C. Perry
*Attorney*—Cullen, Settle, Sloman & Cantor

[57] ABSTRACT

A speed reduction planetary transmission comprises an input sun gear, a series of planet gears meshing with the sun gear and a fixed ring gear, and an output ring gear. The number of teeth on the two ring gears differs by a very small number. The planets are free-floating and constructed to resiliently yield along their diametral dimension, to permit assembly in spite of an intentional interference fit between the gears. This eliminates backlash and distributes the load equally among all the planets. A modified embodiment utilizes a stepped planet gear, part of which meshes with an idler sun gear.

5 Claims, 4 Drawing Figures

3,675,510

INVENTOR
ANDERSON DUGGAR, JR.
BY
CULLEN, SETTLE, SLOMAN & CANTOR.
ATT'YS.

SPEED REDUCER

DETAILED DESCRIPTION OF THE INVENTION

Figure 1:
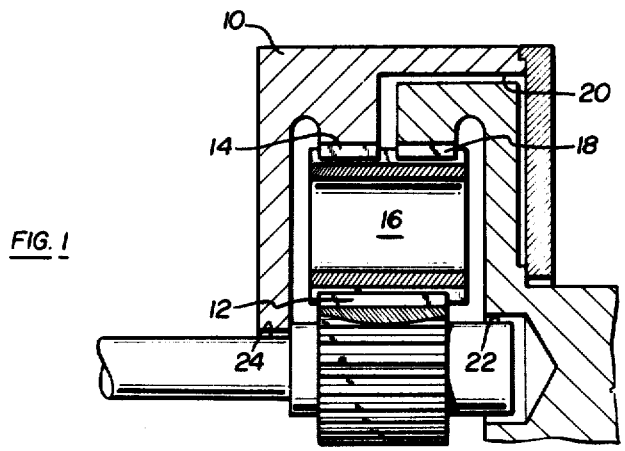
FIG. 1 is a cross-sectional elevation through a planetary gear type of speed-reducing transmission.

A high speed ratio type of planetary gear transmission is illustrated in FIG. 1. Generally, this transmission comprises a housing 10 having an input sun gear 12, a fixed ring gear 14 formed integrally with the housing 10, a series of planet gears 16 (only one of which is illustrated) in mesh with sun gear 12 and ring gear 14, and an output ring gear 18 also in mesh with an axially extended portion of planet gear 16. While only one planet gear 16 is shown, it is understood that a plurality of such gears may be circumferentially spaced about sun gear 12, as is common. If more than one planet gear is used, it will be necessary to make allowance for the different number of teeth on the two ring gears. One method is to form each excess planet gear with two distinct longitudinally spaced gear portions, each identical but angularly indexed slightly relative to each other. Another method is to physically separate each excess planet gear into two unconnected parts, and permit them to find their own meshing location. The choice of these methods is governed by bearing loads, number of teeth, and so forth, as will be understood by those skilled in the art.

As is well known in high ratio planetary transmissions of this type, if the number of teeth on ring gear 14 differs by a very small number from the number of teeth on ring gear 18, then ring gear 18 will rotate at an extremely low angular velocity relative to that of input sun gear 12. This is so because as planet gear 16 walks around the interior of stationary ring gear 14, it will cause output ring gear 18 to rotate through an arc approximately equal to the difference in the number of teeth between the two ring gears for each revolution of planet gear 16 about sun gear 12. For example, if fixed ring gear 14 has 120 teeth, ring gear 18 119 teeth and sun gear 12 12 teeth, then the ring gear 18 will make one revolution for every 1309 revolutions of input sun gear 12.

The present invention relates to means for improving the compactness and load carrying capacity of transmissions of this general type, while reducing the backlash. The first factor which contributes to the achievement of these objectives is free-floating planet gears 16. That is, they are not mounted on a spider or carrier member. This means that they are self-centering and will seek their own proper meshing position among the sun and ring gears.

Figure 2:
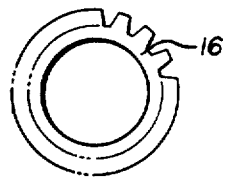
FIG. 2 is an end view of a typical planet gear shown in FIG. 1.

Secondly, the gear elements are dimensioned so as to require a slight interference fit at the time of assembly. To facilitate such assembly, notwithstanding the interference fit, planet gears 16 are preferably made so as to be resiliently yieldable along their diameters. This can be accomplished by making each of planet gears 16 in the form of a thin-walled annulus as shown in FIG. 2. Alternatively, the planet gears could be made of a semi-resilient or elastic material. Either of these alternatives would permit planet gears 16 to yield or flex at the time they were forceably inserted into mesh between sun gears 12 and ring gears 14 and 18. By this means, planet gears 16 automatically float or shift into a position in the gear set whereby the loads are equalized among the teeth of each of the planet gears. The absence of a spider or carrier member, along with the yieldability of the planet gears, assures that planet gears 16 will shift to the position that produces this result. This combination of factors also substantially eliminates backlash.

Figure 3:
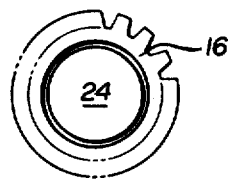
FIG. 3 is an end view, similar to FIG. 2, but showing a modified planet gear.

To achieve the necessary degree of flexing at the time of assembly, it may become necessary to reduce the wall thickness of annular planet gears 16 to a point where the strength of the gear would be inadequate to prevent its deflection entirely out of mesh with the ring or sun gears under high torque load conditions. For this purpose it may be desirable in some circumstances to reinforce the annular planet gears for their load carrying function, while permitting adequate flexing during assembly, by inserting a solid non-compressible plug 24 (as shown in FIG. 3) within annular planets 16. By making the diameter of plug 24 a predetermined amount smaller than the internal diameter of annular planet 16, an annular gap would exist between these two elements to accommodate a predetermined degree of diametral flexing or distortion during assembly, while limiting the ultimate degree of distortion of planet 16 under high load conditions. Alternatively to using a non-compressible plug, a plug having a desired controlled compressibility could be employed.

The above described transmission lends itself especially well to compact high speed reduction units. Where compactness is essential, it becomes desirable to eliminate the additional diametral dimension necessitated by bearings. This invention permits much higher loads to be carried without the need for separate bearing elements. Most importantly, the free-floating and flexing features of the planet gears distribute the load equally among the planets, thus reducing the peak loads often induced in conventional unequally loaded planet gears. Secondly, by using a ring gear as the low-speed high-torque output member, the tooth load is reduced since the high torque occurs at maximum diameter.

As illustrated, no bearing elements are employed. For higher loads, surfaces 20, 22 and 24 could be employed as bearing surfaces, or separate bearing elements could be inserted at those locations.

Figure 4:
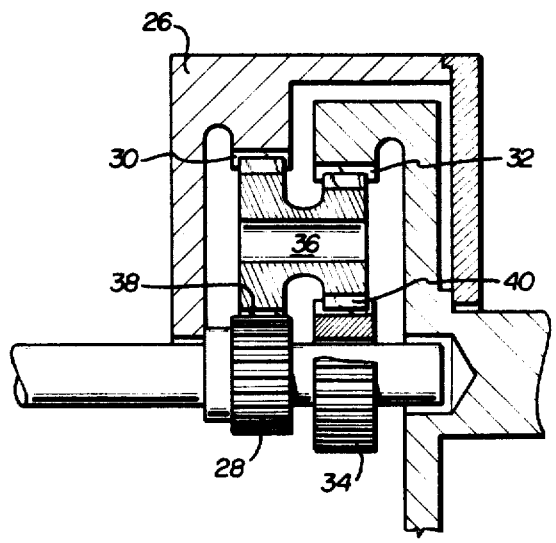
FIG. 4 is a view similar to FIG. 1, but showing a modified form of the invention.

A modified form of the invention is illustrated in FIG. 4. This transmission comprises a housing 26 having an input sun gear 28, a fixed ring gear 30 formed integrally with housing 26, an output ring gear 32, an idler sun gear 34 freely rotatable on an extension of the input sun gear shaft, and a stepped planet gear 36. A first gear portion 38 of planet gear 36 meshes with sun 28 and ring 30, while the second smaller portion 40 meshes with sun 34 and ring 32. As described above regarding planet 16, planet gear 36 is also of thin-walled annular construction, either with or without a reinforcing plug, to achieve the desired resilience.

An exemplary form of the FIG. 4 embodiment would employ the following numbers of teeth: 12 teeth on sun 28, 15 teeth on sun 34, 54 teeth on planet 38, 51 teeth on planet 40, 120 teeth on ring 30, and 117 teeth on ring 32. This would yield a gear ratio of 351:1.

The configuration of FIG. 4 provides another method of allowing for the problem of meshing with two different sized ring gears. The idling sun gear 34 merely takes up the radial forces from planet 40.

While only two gear configurations have been illustrated it is to be understood that other layouts could be used without departing from the spirit of this invention. For example, higher ratios could be obtained by adding further gear sets in series so that ring gear 18 would be the input member for an additional gear set.

I now claim:

1. In a planetary gear type speed-reducing transmission characterized by an input sun gear, a fixed non-rotatable ring gear, at least one free-floating planet gear engaging said sun and fixed ring gears to be driven by said sun gear and unsupported by any planet gear carrier member, and a rotatable ring gear engaging said planet gears to be driven thereby, the transmission containing no carrier-supported planet gears, the numbers of teeth on said two ring gears differing by a very small number so that a high speed reduction ratio is created between said input sun gear and said rotatable ring gear, the improved method of increasing the load carrying capacity while reducing backlash in the transmission which comprises the steps of:

forming said gears to relative diametral dimensions resulting in a slight interference fit at the time of assembly; and fabricating said planet gears in such a manner that their diametral dimensions are resiliently yieldable within the range of forces encountered in overcoming the interference fit at the time of initial assembly of the transmission;

whereby the deflection of said planet gears required for assembly of the transmission coupled with the free-floating mounting of said planet gears produces a tightly meshing transmission wherein the loads are distributed equally among all the said planet gears and wherein backlash is substantially eliminated.

2. The transmission of claim 1 wherein the resilient yieldability of said planet gears is achieved by forming each planet gear as a thin-walled annulus.

3. The transmission of claim 1 wherein the resilient yieldability of said planet gears is achieved by forming each planet gear of a resilient material.

4. The transmission of claim 2 wherein a reinforcing central plug is inserted within the bore of each of said annular planet gears, with a predetermined radial gap between said plug and its associated planet gear, to limit the extent of the flexing of said planet gears.

5. The transmission of claim 1 wherein said planet gears are stepped so as to have two distinct gear portions of appropriate diameters for meshing with the fixed and rotatable ring gears.

* * * * *